United States Patent [19]

Kitajima

[11] 4,073,584
[45] Feb. 14, 1978

[54] SLIT EXPOSURE DEVICE FOR USE WITH A STATIONARY ORIGINAL CARRIAGE

[75] Inventor: Tadayuki Kitajima, Yokohama, Japan

[73] Assignee: Canon Kabushiki Kaisha, Tokyo, Japan

[21] Appl. No.: 665,393

[22] Filed: Mar. 10, 1976

Related U.S. Application Data

[62] Division of Ser. No. 589,086, June 23, 1975, abandoned, which is a division of Ser. No. 509,077, Sept. 25, 1974, abandoned.

[30] Foreign Application Priority Data

Sept. 27, 1973 Japan .................................. 48-108676

[51] Int. Cl.$^2$ ............................................ G03G 15/28
[52] U.S. Cl. ..................................... 355/8; 242/47.5; 355/66; 355/84
[58] Field of Search ...................... 242/47.5; 355/8, 47, 355/60, 65, 66, 84, 81

[56] References Cited

U.S. PATENT DOCUMENTS

| 2,201,954 | 5/1940 | Flygare | 242/47.5 |
| 3,815,991 | 6/1974 | Janssen et al. | 355/66 |
| 3,832,057 | 8/1974 | Shogren | 355/8 |

Primary Examiner—Richard L. Moses
Attorney, Agent, or Firm—Fitzpatrick, Cella, Harper & Scinto

[57] ABSTRACT

A slit exposure device of the type in which an original carrier is fixed and an optical system is movable. A driving force transmitting member adapted to move an optical system is passed over output shafts, and rotation of the output shafts causes two groups of optical elements to be reciprocated at a speed ratio of 2 : 1. One of the movable groups of elements requires that an electric cord be connected thereto, wherein one end of the electric cord is fixed, the direction of the cord being changed during movement by means of a rotatable member.

3 Claims, 7 Drawing Figures

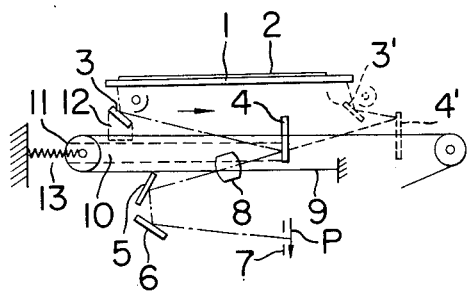
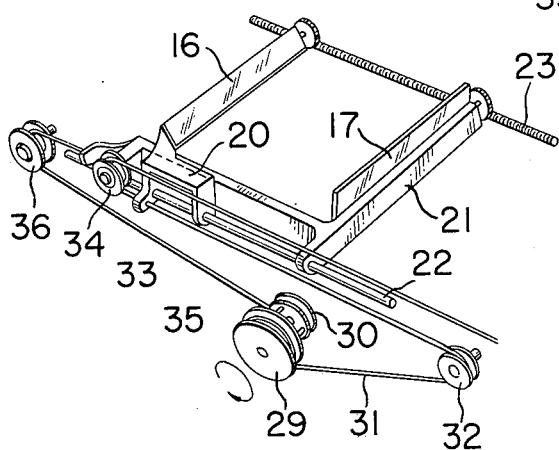
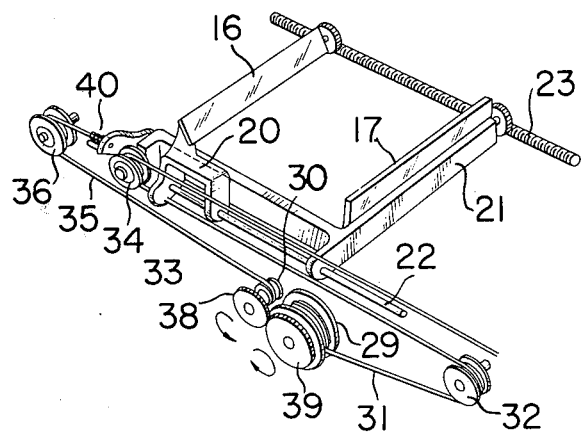

FIG. 7
(a)
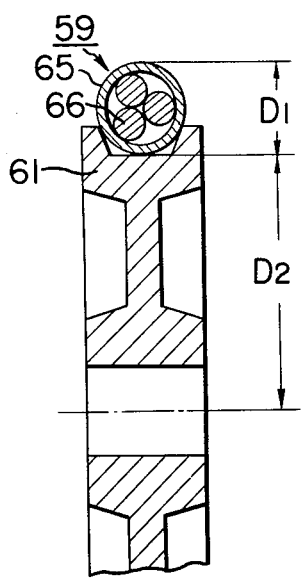
(b)
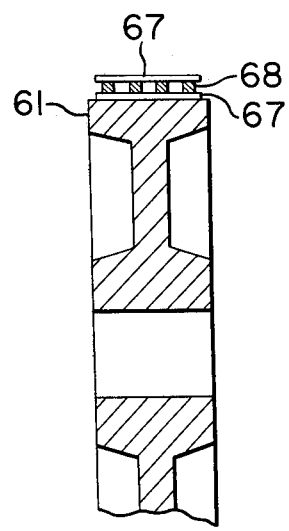
(c)
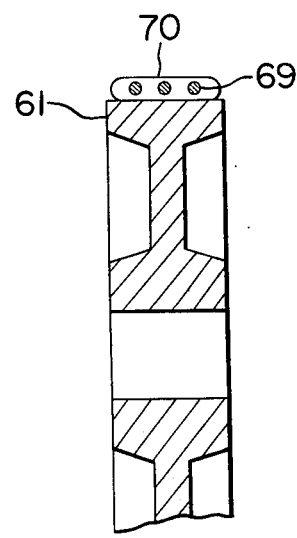

SLIT EXPOSURE DEVICE FOR USE WITH A STATIONARY ORIGINAL CARRIAGE

This is a division of application Ser. No. 589,086, filed June 23, 1975, which in turn is a divisional application of Ser. No. 509,077, filed Sept. 25, 1974, both now abandoned.

BACKGROUND OF THE INVENTION

1. Field of the Invention

This invention relates to a slit exposure device, and more particularly, to a slit exposure device of the type with a fixed original carrier and a movable optical system. More specifically, the invention relates to a slit exposure device comprising improved optical system drive means of the type in which two or a group of moving mirrors are moved at a speed ratio of 2 : 1, and means for connecting a power source for illuminating an original.

2. Description of the Prior Art

Slit exposure devices of the type with a fixed original carrier and a movable optical system are known, and particularly, various optical systems of the type in which two moving mirrors or lenses are moved at a speed ratio of 2 : 1 are known, such as disclosed in U.S. Pat. Nos. 3,330,181; 3,431,053; 3,497,298; 3,062,108 and 3,689,145.

A conventional optical system drive device is illustrated in FIG. 1, which shows an original 2 to be copied, placed on a fixed original carrier 1 wherein an image of the original is formed on a photosensitive medium P, which passes through a slit 7, by an optical system consisting of mirrors 3 and 4, a fixed lens 8, and fixed mirrors 5 and 6. As the photosensitive medium moves forward in the direction as indicated by the arrow, the mirror 3 will move, in the direction as indicated by the arrow, at a predetermined speed relative to the moving speed of the photosensitive medium, while the mirror 4 will move, in the direction as indicated by the arrow, at a speed of ½ of the speed of mirror 3, whereby the slit exposure is effected, always maintaining a constant length of an optical path from the original 2 to the lens 8. When the mirrors 3 and 4 reach end positions 3' and 4' (as indicated by the dotted lines) from the exposure starting positions (as indicated by the full lines), they again move back to the exposure starting positions for accomplishment of the next exposure.

In this case, the optical system performs a reciprocating motion, and to obtain a better copied image, the above-described mirrors 3 and 4 must be moved by the strict maintenance of speed ratio on the order of 2 : 1. The simplest method for this purpose is to utilize the principles of the pulleys as shown in FIG. 1. As seen in FIG. 1, a wire 9 having one end thereof secured to a copying machine body is passed over a pulley 11 mounted on a bed 10 on which the mirror 4 is placed. The mirror 3 is placed on a bed 12, and when the other end of the wire is pulled by a suitable drive means, to the right as viewed in the figure, the mirror 3 and the mirror 4 may be moved to the right by the strict maintenance of speed ratio on the order of 2 : 1, thus attaining the desired end. Application of this optical system into a copying machine requires movement thereof in the form of a reciprocating motion. Thus, the supports 10 and 12 reached at the right extremity in the movable range shown in FIG. 1 are allowed to be returned to their original positions. For the returning means, there has been proposed one of which the elasticity of spring 13 is utilized as shown in FIG. 1, and the other of which a motor in place of the spring 13 is employed as drive means. However, in the method for returning the optical system by the elasticity of the spring, a spring greater in shape must be used where the optical system travels a long stroke, and as a result the spring would occupy a greater portion of space in the machine and hence the entire machine becomes larger in size. Additionally, acceleration due to the spring characteristic makes it hard to control a return speed and to further produce great shocks when the optical system is stopped at its initial position. The shocks cause the optical system to be vibrated, and better copied images may not be obtained before such vibration is damped. Obviously, the durability of the optical system, which is generally said to be not so slight in nature, is adversely affected by the spring.

Further, in the method for returning the optical system which uses the motor as drive means instead of springs, a sag is created in the wire due to the delay in start of the motor where the motor is rotated at high speeds to move the wire, and for this reason, the optical system may not be moved smoothly.

A method of wiring electric cords for illuminating an original will now be discussed. In a conventional copying machine wherein an original is placed on a stationary carriage, and optical mirrors including a light source are moved at a ratio of 1 : ½ for a copying process, there are two methods for arranging electric cords connected to the above-mentioned optical system. Firstly, in accordance with the first method, an electric cord having a length corresponding to that of the whole stroke of movement of the optical system is pre-attached to the moving optical system, and a portion of the cord sagged due to the movement of the optical system is left to be hung in a space. Secondly, in accordance with the second method, there are incorporated a rail-like member in conductive condition and an electricity receiving contact used in the moving optical system. These conventional methods suffer from the following problems. In the first method above, holding parts on the opposite ends of the electric cord are subjected to severe damage due to the stress caused by the sagging of the cord created because of movement of the optical system. Moreover, the sagged cord tends to come into contact or to be caught in other parts of the machine, thus not only interfering with a smooth operation but involving risk such as damage to insulation covering of the cord. As for the problems encountered in the second method above, it is not possible to coat the rail-like member, in which a great current flows, with an insulation covering in view of such object that current is passed while being slid thereon, and it is not preferable from a standpoint of safety that the rail without having the covering as described above is disposed within the machine. Furthermore, faulty contact tends to be created between the contact and the rail member, and the image formed becomes discontinuous due to the occurrence of sparks or interruption of current. Additionally, the severe wear of the contact results in a troublesome maintenance such as replacement of the contact and the like.

SUMMARY OF THE INVENTION

It is therefore an object of the present invention to provide a simple slit exposure device which has overcome various problems noted above with respect to prior art devices.

It is another object of the present invention to provide a slit exposure device which includes an improved drive device, whereby optical members moved at a speed ratio of 2 : 1 are reciprocated.

It is a further object of the present invention to provide a slit exposure device in which an improvement is brought about with respect to the arrangement of a power source connection cord to a light source for illuminating an original.

BRIEF DESCRIPTION OF THE DRAWINGS

FIG. 1 illustrates a prior art optical system drive device in a copying machine;

FIGS. 2 and 3 are perspective views of an optical system drive device in a copying machine of the present invention;

FIG. 4 is a perspective view of a modified form of the device according to the present invention;

FIG. 7 is a view of assistance in explaining the electric cord and pulleys as shown in FIGS. 5 and 6.

DESCRIPTION OF THE PREFERRED EMBODIMENTS

Figure 5:
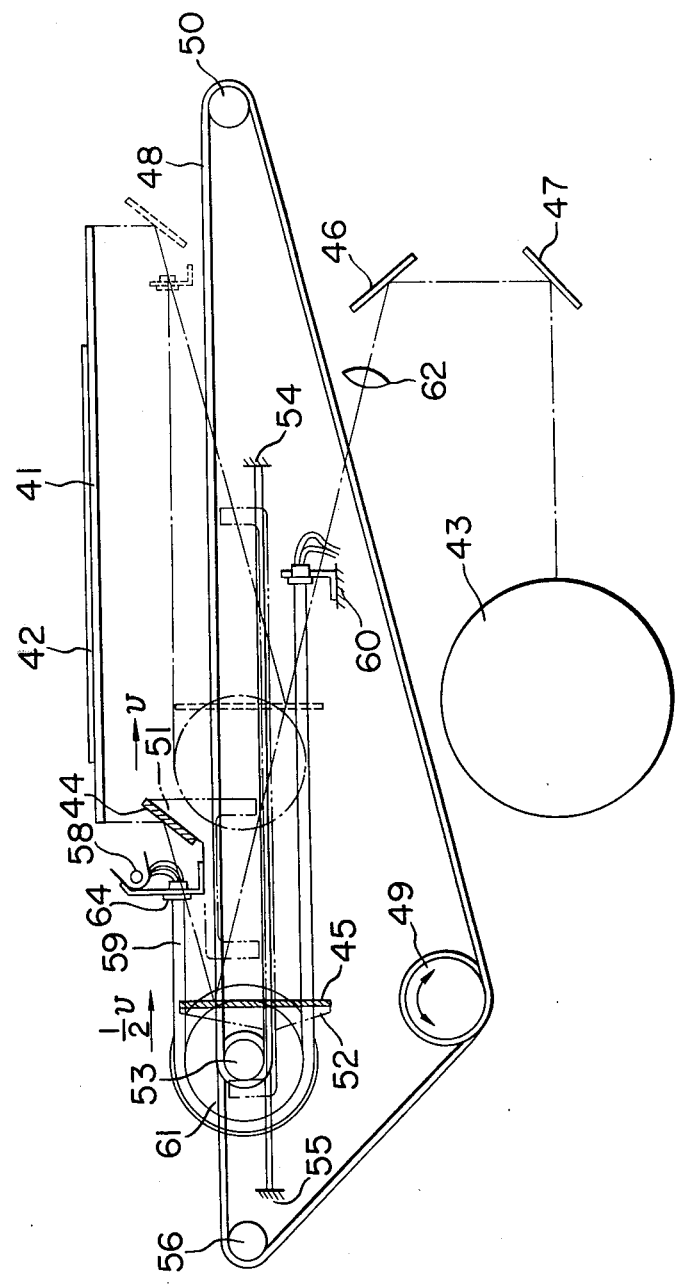
FIGS. 5 and 6 are views of assistance in explaining the construction principally including an optical system in an electrophotographic copying machine in a preferred form of the present invention.

In FIGS. 2 and 3 there is shown a preferred embodiment of the present invention by way of an electrophotographic machine, as an example, wherein an electrostatic latent image is formed on a photosensitive medium, after which the image is powder-transferred by a transfer material. In these figures, the reference numeral 14 designates an original, and 15 designates a lamp for projecting the original. Moving mirrors of the type similar to those as discussed in FIG. 1 are indicated at 16 and 17, and fixed mirrors are indicated at 18 and 19, and exposure starting positions are shown in full lines and end positions shown in dotted lines. The lamp 15 and mirror 16 are secured to the moving bed 20, and the mirror 17 is secured to the moving bed 21. The beds 20 and 21 are designed so that they may be moved on rails 22 and 23, respectively, to the left and right as viewed from the figure. There is provided a lens 24 to form an image on a photosensitive medium P which passes through an exposure station 25. The photosensitive medium P, which rotates in the direction as indicated by the arrow, is uniformly charged by a charger 27 and is then discharged simultaneously with application of image light by a discharger simultaneously with application of image light to thereby form an electrostatic latent image thereon. The electrostatic latent image on the photosensitive medium P is formed into a visual image at a next step of process (developing station) 37 and is transferred on a transfer medium C, which is received in the direction as indicated by the arrow, by means of a transfer charger 26. An intermittent drive motor (not shown) is employed to serve as drive means for driving an optical system in the illustrated copying machine, the motor causes its output shafts, both large and small sized pulleys 29 and 30, to be rotated. A wire 31 with its one end secured to and wound on the larger pulley 29 is passed over a pulley 32 secured to the copying machine body on the right side and disposed rotatably so as to be directed in the opposite direction, and is secured to the bed 20 by means of a fixing member 33 interposed therebetween, and the wire is passed over a pulley 34 on the bed 21 through the bed 20 and then secured to the copying machine body. Another wire 35 with its one end secured to the small pulley 30 and wound thereon in a desired amount is turned through a fixed pulley 36 in the opposite direction, while the other end of the wire being secured to the bed 21. These two large and small pulleys 29, 30 on which the wire is wound have their predetermined diameter in a ratio of 1 : ½. Thus, it will be apparent that the intermittent drive motor may be switched to proper or reverse revolutions, thereby effecting a reciprocating motion of the optical system, when the bed 21 is moved at a speed ½ that of the bed 20 with the aid of the pulley 34, thus satisfying the aforementioned conditions.

Rotation of the motor causes the optical system constructed as described above to initiate movement from the exposure starting position as indicated in full line to the end position as indicated in dotted line to scan the original 14. In synchronism with the scanning of the original, an original image is exposed through the above-described optical system in the exposure station 25. When the optical system reaches the end position, the motor changes its direction of rotation to return the optical system to the exposure starting position as indicated in full line.

A modified form of embodiment is illustrated in FIG. 4. In the embodiment shown in FIG. 4, the wire is passed over in the same manner as shown in FIGS. 2 and 3 except that the pulleys 29, 30 in FIGS. 2 and 3 are separated into two. The large pulley 29 and small pulley 30 have their diameter in a ratio of 1 : ½. Gears 38 and 39 directly connected to the pulleys 29 and 30 have teeth same in number, which are engaged from one another. With a construction as described above, when the wire 31 is taken on the pulley 29, the mirror 16 on the bed 20, to which the wire is secured, is moved to the right at a speed of "1", while the pulley 34 rotatably mounted on the bed 21, the other end of the wire being secured to the machine body, is moved forward to the right maintaining the speed of "½". On the other hand, another wire 35 connected through a spring 40 to the aforementioned bed is changed in direction by means of the fixed pulley on the left so that the mirror may be moved forward by taking up the wire, the other end of which is secured to and wound on the small pulley 30 directly connected to the gear 38 on the left in the figure, thus attaining the desired function in a sufficient manner. Although not shown, it is to be understood that both the pulleys may have the same diameter and the number of teeth of the gears may be determined in a ratio of 1 : ½.

While the above-described embodiments have been described with utilization of wire and pulleys as the means for transmitting the driving force of the motor, other arrangements such as a combination of a chain and chain gear, or a combination of a perforated belt and sprocket, etc. may also be employed. Moreover, while the above embodiments have been illustrated as being applied to the transfer type electrophotographic copying machine, it is to be understood that the embodiments may also be applied to those copying machines of the type in which an image is directly formed on a sheet of photosensitive paper such as electrofax.

As is apparent from the foregoing, the present invention provides an arrangement in which the driving force transmitting member for moving the optical system is passed over the output shafts, and rotation of the output shafts causes two groups of optical elements to be reciprocated at a speed ratio of 2 : 1. With this construction, conventional springs are obviated in the attempt to move the optical system, whereby the occurrence of shocks as noted above is prevented when the optical system is stopped. As a result, in operation of continuous copying, there is no necessity of considering the attenuation of vibration of the optical system caused by the shocks and hence the durability of the optical system is not adversely affected. Moreover, since the optical system may be reciprocated by one drive source, there is no sagging of the wire, which sagging tends to occur in the case where two drive sources exist. This allows movement of the optical system in a smooth manner and with an accurate ratio of 2 : 1 to be realized at a reduction in cost even at high speeds. From the above, it will be apparent that the present invention overcomes various problems noted above and may provide an optical system drive device which is simple in construction.

The method of disposing light souce electric cords for illuminating an original, which is applied to the slit exposure device in accordance with the present invention, will now be described.

The present invention provides a method of disposing electric cords applied to moving electricity utilizing members, one end of the cord being fixed and the cord being changed in direction by means of a rotatable member such as pulleys, wherein the wiring is so arranged that a moving member having the electricity utilizing members carried thereon is disposed on the other end of the cord. With this arrangement, the electric cord is not applied with unnecessary tension and creates no sag in any position of the moving stroke of the moving member. Preferably, the above-described rotatable member may have at least portions, with which the electric cord comes into contact, covered by insulation.

Figure 6:
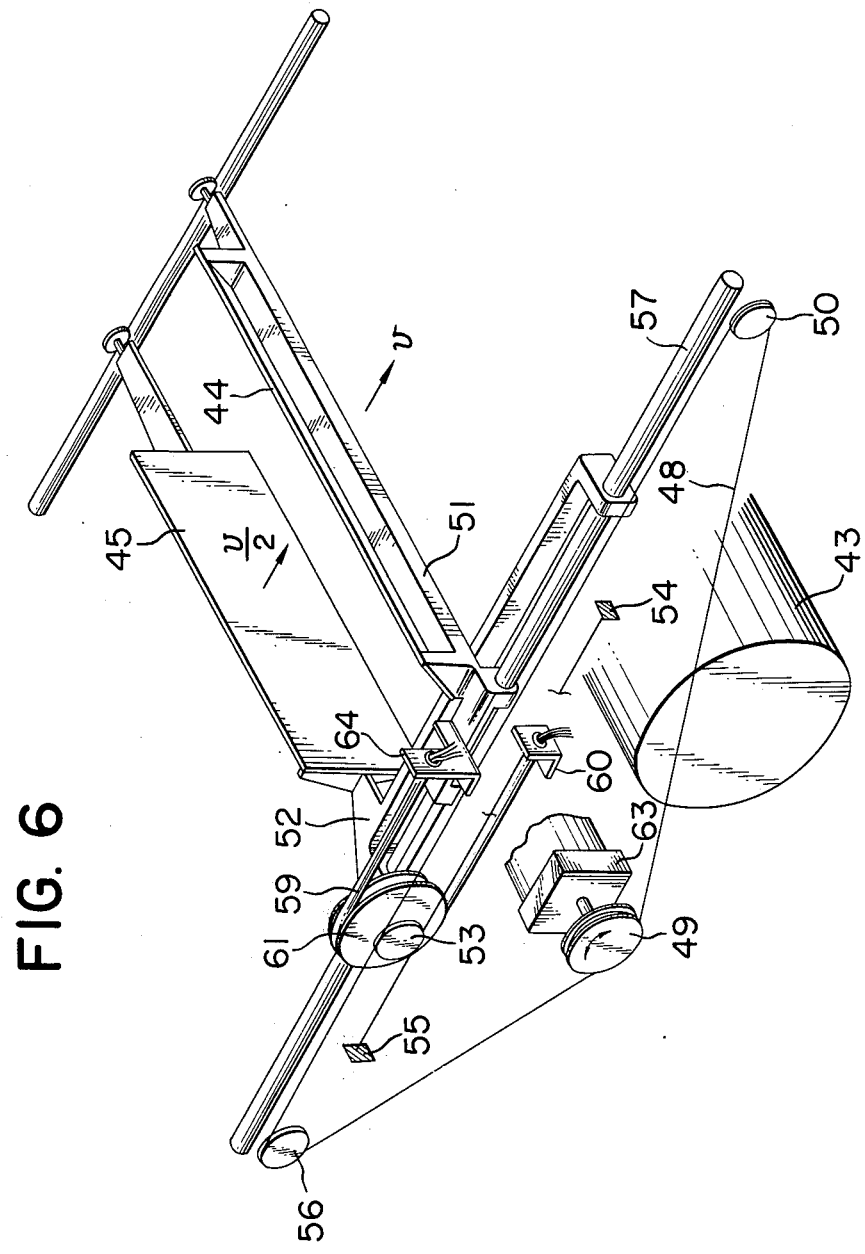

A preferred embodiment of the present invention will further be discussed with reference to the accompanying drawing. The illustrated embodiment herein is described with respect to an optical system including a light source in an electrophotographic copying machine of the type in which an original carrier is fixed and incorporating therein a drum-like photosensitive medium having a photoconductive layer. FIG. 5 is a side view showing the embodiment as just mentioned, and FIG. 6 is a perspective view showing a construction of mirrors and drive systems. Referring to FIGS. 5 and 6, and particularly to FIG. 5, there is shown an original carrier 41, on which an original 42 is placed, the original carrier 41 being in fixed condition. Mirrors 44, 45, 46 and 47, and a lens system 62 are provided to form the image of the original 42 on the surface in the outer pheriphery of a drum-like photosensitive medium 43. It is known in general that when the mirror 44 is moved at a speed of $v = 1$ along a guide rail 57, the mirror 45 moves in the same direction as the mirror 44 at a speed of $v = \frac{1}{2}$. The mirrors may be driven by a wire 48, which is wound around a pulley 49 three or four times, the pulley 49 being engaged with a reversible motor 63 as a drive source. The wire 48 has its one end changed in direction by a fixed pulley 50, and is fixed at (x) on a mount 51 placed on the mirror 44 and then guided along a pulley 53, through which the wire is reversed and fixed at the fixing portion 54. On the other hand, after the other end of the wire has been changed in direction by a fixed pulley 56, the wire reaches the pulley 53, through which the wire is reversed and fixed at the fixing portion 55. It is noted that the pulley 53 is rotatably mounted on the mount 52 for the mirror 45 to be moved at "$\frac{1}{2} v$" relative to the mirror 44 to be moved at "1 v".

With an arrangement of the wire 48 as described above, the mirrors 44 and 45 may accurately be moved in linear fashion along the guide rail 57 at a speed of 1 : $\frac{1}{2}$.

An illuminating lamp 58 station for projecting the surface of an original, in which electric cords are arranged in accordance with the present invention, will now be described. A current required for the lamp 58 is supplied through an electric cord 59, but those problems as noted above with respect to prior arts cannot be removed if the cord 59 is connected, with a mere sag, between the fixing member 64 in the vicinity of the lamp and the other fixing member 60. From this, it is obvious that the cord 59 may be caught in members arranged nearby to impart damage to the cord and to interfere with a smooth copying operation.

In accordance with the present invention, however, the cord 59 with one end secured to the fixing member 60 as explained hereinbefore is reversed by the pulley 61 rotatably mounted on the mount 52 for the mirror 45 to be moved at a speed of "$\frac{1}{2}$", whereafter the other end thereof is secured to the fixing member 60. It is, of course, to be understood that the pulley 61 may coaxially be arranged with the pulley 53 or both the pulleys may comprise the same member. Further, the electric cord 59 is in parallel condition before or after the cord is reversed, and the cord is designed so as to have the minimal length as required for the function thereof, and either end of the fixing members is made slidable so as not to produce unnecessary tension, thus allowing adjustment of the tension. Depending upon the kind and characteristic of the electric cord 59, the pulley 61 may have a suitable diameter so that the cord may be prevented from being subjected to an excessive bending moment, thus increasing the effective service life of the cord.

The arrangement of the electric cord 59 and the pulley 61 will now be discussed with reference to FIG. 7. It will be apparent that the electric cord may be in the form of a circular section with conductors 66 covered with an insulator 65 as shown in FIG. 7(a), or in the form of a configuration with a plurality of conductors 68 laminated by a film-like insulator 67 as shown in FIG. 7(b), or in the form of a flat plate with a plurality of conductors 70 embedded within an insulator 69. For practical use, the electric cord in the form of a flat plate as described above is preferred because of its durability against bending stress of one dimension, and is effective because of the fact that the pulley may be small-sized in diameter.

In the relative relationship of the diameter of the cord having a circular section as shown in FIG. 7(a) to the minimal value of the diameter of the pulley, it has been found that with a flexible cord having a core of a twist wire coated with vinyl chloride, if the value is determined on the order of $D_2 \geq 11 \times D_1$, the cord may withstand repeated use without suffering from fatigue. From this, if $D_1$ is set to 6.4mm, $D_2$ becomes about 7.2cm. On the other hand, in the case of the cord having a section in the form of a flat plate as shown in FIGS. 7(b) and (c), it is to be understood from the above-mentioned reasons that the diameter of the pulley may be decreased to an extreme extent and additionally the provision of guide flanges on the opposite ends of the pulley may be obviated. Moreover, the pulley may be formed of insulative materials and the bearing members may be formed of insulative materials (such as resins), whereby if the insulating coating of the electric cord should be damaged, a breaker in the safety circuit serving as a short in the electric circuit would be cut off without imparting electric leakage to the machine to stop supply of power, thus preventing users from any danger.

As hereinbefore described by way of an optical system in a copying machine as an example, the present invention provides an arrangement wherein one end of the electric cord is fixed, the electric cord being changed in direction by a rotatable member and the wiring is so arranged that a moving member having electricity utilizing members carried thereon is disposed on the other end of the cord. This eliminates the provision of rail members, in which a great current flown, for the above-described moving member, and further eliminates the provision of contact for receiving the electricity and hence spark faults between the rail member and the contact, replacement of contact, etc., thus providing remarkably effective maintenance. Since the cord may be kept from dropping between the fixing member on the moving member side of the electric cord and the other fixing member, it may be free of damage such as electricity leakage due to the breakage of the insulating coating material. Accordingly, the present application discloses a novel invention which is capable of providing a method of disposing electric cords while eliminating the various problems noted above.

It will be further understood that the present invention is not limited to the optical system in the copying machine, but it may also be applied to all devices having reciprocating elements provided with electrical parts in the fields such as machine tools, industrial machines, civil enginerring machines, etc., and thus the invention provides remarkably effective means.

I claim:

1. An electrophotographic apparatus comprising:
   a stationary original carriage for carrying an original thereon;
   a first mirror means for reflecting image light of the original, said first mirror means being movable in parallel with said original carriage;
   a light source for illuminating the original, said light source being integral with said first mirror means;
   a second mirror means for receiving the image light which has been reflected by said first mirror means, said second mirror means being movable in the same direction as that of said first mirror means and at a speed which is one half the speed of movement of said first mirror means to direct the image light to a predetermined position;
   projection lens means for focussing the image light which has been reflected by said second mirror means onto a photosensitive member to form an image of the original on a surface of the photosensitive member;
   a rotatable pulley movable together with said second mirror means;
   a mirror transport wire engaged with said pulley;
   driving means for moving said transport wire to move said second mirror means at said half speed and for rotating said pulley; and
   an electric wire having one end connected to said light source fixed on said first mirror means, said electric wire travelling around said rotatable pulley for coupling to a power source in such a manner that said electric wire is not damaged due to movement of said light source.

2. An apparatus according to claim 1, wherein a portion of said pulley which contacts said electric wire comprises an insulating material.

3. An apparatus according to claim 1, wherein a radius of said pulley is not less than 11 times a diameter of said electric wire.

* * * * *